(12) United States Patent
Muraoka et al.

(10) Patent No.: US 6,462,810 B1
(45) Date of Patent: *Oct. 8, 2002

(54) SURVEYING SYSTEM

(75) Inventors: Yoshiaki Muraoka; Ikuo Ishinabe; Sho-ujiro Takahashi, all of Tokyo-to (JP)

(73) Assignee: Kabushiki Kaisha TOPCON, Tokyo-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/525,164

(22) Filed: Mar. 14, 2000

(30) Foreign Application Priority Data

| Mar. 26, 1999 | (JP) | 11-083434 |
| Dec. 22, 1999 | (JP) | 11-364155 |

(51) Int. Cl.$^7$ .............. G01B 11/26; G01C 1/00
(52) U.S. Cl. .............. 356/139.04; 356/139.02; 356/141.3
(58) Field of Search ............ 356/139.04, 141.3, 356/139.02

(56) References Cited

U.S. PATENT DOCUMENTS

| 3,857,639 A | * | 12/1974 | Mason | 356/156 |
| 5,313,409 A | | 5/1994 | Wiklund et al. | 364/556 |
| 6,023,326 A | * | 2/2000 | Katayama et al. | 356/141.3 |
| 6,057,537 A | * | 5/2000 | Schubert et al. | 250/205 |

* cited by examiner

*Primary Examiner*—Thomas H. Tarcza
*Assistant Examiner*—Brian K. Andrea
(74) *Attorney, Agent, or Firm*—Nields & Lemack

(57) ABSTRACT

The present invention provides a surveying system, which comprises a survey instrument main unit for receiving and detecting a guide light projected from a collimation target, a horizontal rotating mechanism 38 for rotating the survey instrument main unit in a horizontal direction, a control unit 37 for controlling the horizontal rotating mechanism, a rough direction detecting unit 24 capable to detect the guide light from all horizontal directions, and a precise direction detecting unit 25 arranged in a direction to collimate the survey instrument main unit from a telescope and detects said guide light only in a range of a predetermined angle, wherein said control unit controls the horizontal rotating mechanism so that a direction of the survey instrument main unit is aligned to the collimation target based on a result of a detection from said rough direction detecting unit, and collimates the survey instrument main unit is collimated to the collimation target based on a result of a detection from the precise direction detecting unit.

5 Claims, 8 Drawing Sheets

SURVEYING SYSTEM

BACKGROUND OF THE INVENTION

The present invention relates to a surveying system for searching a target and for automatically performing a collimation.

The survey operation is performed using a survey instrument positioned at a reference point and a collimation target (a reflection mirror, a corner cube, etc.) installed at a target point which is to be collimated by the survey instrument.

With the progress in an automation technique, the survey instrument is also under the influence of such a trend, and a survey operation is now generally practiced by an one-man operation.

A survey instrument thus automated comprises an angle detector for measuring a direction of the collimation, and a light wave survey instrument for measuring the distance to a collimation target. Further, in order to achieve the survey operation under one-man control, it is provided with a tracking function for detecting and tracking the collimation target. In the survey operation under one-man control, an operator is positioned on collimation target side, and the collimation target is moved by the operator depending on a working process. When the operator moves the collimation target, the survey instrument tracks the collimation target and automatically collimates the collimation target.

Once the survey instrument has collimated the collimation target, the collimation target is automatically tracked. In this case, the range of collimation is limited to a range of visual field of a telescope of the survey instrument. Therefore, when the collimation target is moved, and if the collimation target is moved at such speed that tracking can be performed, tracking can be carried out without any problem. However, if the moving speed is higher than the speed, at which tracking can be performed or in case the collimation target is beyond the visual field of the telescope, tracking cannot be performed. Or, in case the visual field is temporarily interrupted by some obstacle, no tracking can be carried out. When tracking cannot be performed, similarly to the case where the collimation target is collimated for the first time, the survey instrument is rotated approximately over total circumference to search the collimation target.

To search the collimation target, the survey instrument is rotated over total circumference, and a reflection beam of the laser beam from the survey instrument reflected by the collimation target is detected by the survey instrument.

When the survey instrument searches the collimation target, the reflection beam from the collimation target must be detected by the telescope. However, the visual field of the telescope is narrow, and the survey instrument main unit must be rotated repeatedly over total circumference while changing the vertical angle. It is necessary to frequently perform the searching of the collimation target, not only in the first collimation in the survey operation but in the middle of surveying process from the reasons as described above. Because it takes much time for the searching of the collimation target at present, it is very important to search the collimation target within short time and in an efficient manner in order to increase working efficiency in the survey operation under one-man control.

When we consider the guide light entering the survey instrument, not only the guide light directly entering from the collimation target, but also the guide light reflected by an optical system after entering the survey instrument is included in it. Further, the light other than the guide light is also included. The light and beam reflected by the optical system is turned to noise, and S/N ratio is decreased. When S/N ratio is low or when S/N ratio is changed due to the light receiving condition, an amplification factor of a photodetection signal from a photodetection element must be changed to an optimal value. This causes such a problem that much time is required for the searching of the collimation target.

SUMMARY OF THE INVENTION

It is an object of the present invention to provide a system, by which it is possible to promptly detect a collimation target without rotating the survey instrument main unit over total circumference and to perform the searching of the collimation target within short time and in efficient manner. It is another object of the present invention to provide a system, by which it is possible to improve S/N ratio of the received reflection beam and to perform the collimation of the collimation target within the shortest time.

To attain the above objects, the surveying system according to the present invention comprises a survey instrument main unit for receiving and detecting a guide light projected from a collimation target, a horizontal rotating mechanism for rotating the survey instrument main unit in a horizontal direction, a control unit for controlling the horizontal rotating mechanism, a rough direction detecting unit capable to detect the guide light from all horizontal directions, and a precise direction detecting unit arranged in a direction to collimate the survey instrument main unit from a telescope and detects the guide light only in a range of a predetermined angle, wherein the control unit controls the horizontal rotating mechanism so that a direction of the survey instrument main unit is aligned to the collimation target based on a result of detection from the rough direction detecting unit, and collimates the survey instrument main unit to the collimation target based on a result of a detection from the precise direction detecting unit. Further, the present invention provides a surveying system as described above, wherein the precise direction detecting unit comprises a photodetection sensor, a photodetection limiting means for limiting a photodetection range in a horizontal direction of the photodetection sensor, and an optical means for converging the guide light at a position of the photodetection limiting means. Also, the present invention provides a surveying system as described above, wherein the optical means is a cylinder lens. Further, the present invention provides a surveying system as described above, wherein the optical means is a cylinder lens curved around a focal point thereof. Also, the present invention provides a surveying system as described above, wherein the photodetection limiting means is a mask arranged on a photodetection surface of the photodetection sensor. Further, the present invention provides a surveying system as described above, wherein the photodetection limiting means is a diaphragm plate arranged at a focal point of the optical means. Also, the present invention provides a surveying system as described above, wherein the photodetection limiting means further comprises a front stage diaphragm for cutting off reflection lights in the precise direction detecting unit. Further, the present invention provides a surveying system as described above, wherein the front stage diaphragm has a plurality of slits with size thereof gradually reduced toward a photodetection surface.

Figure 6:
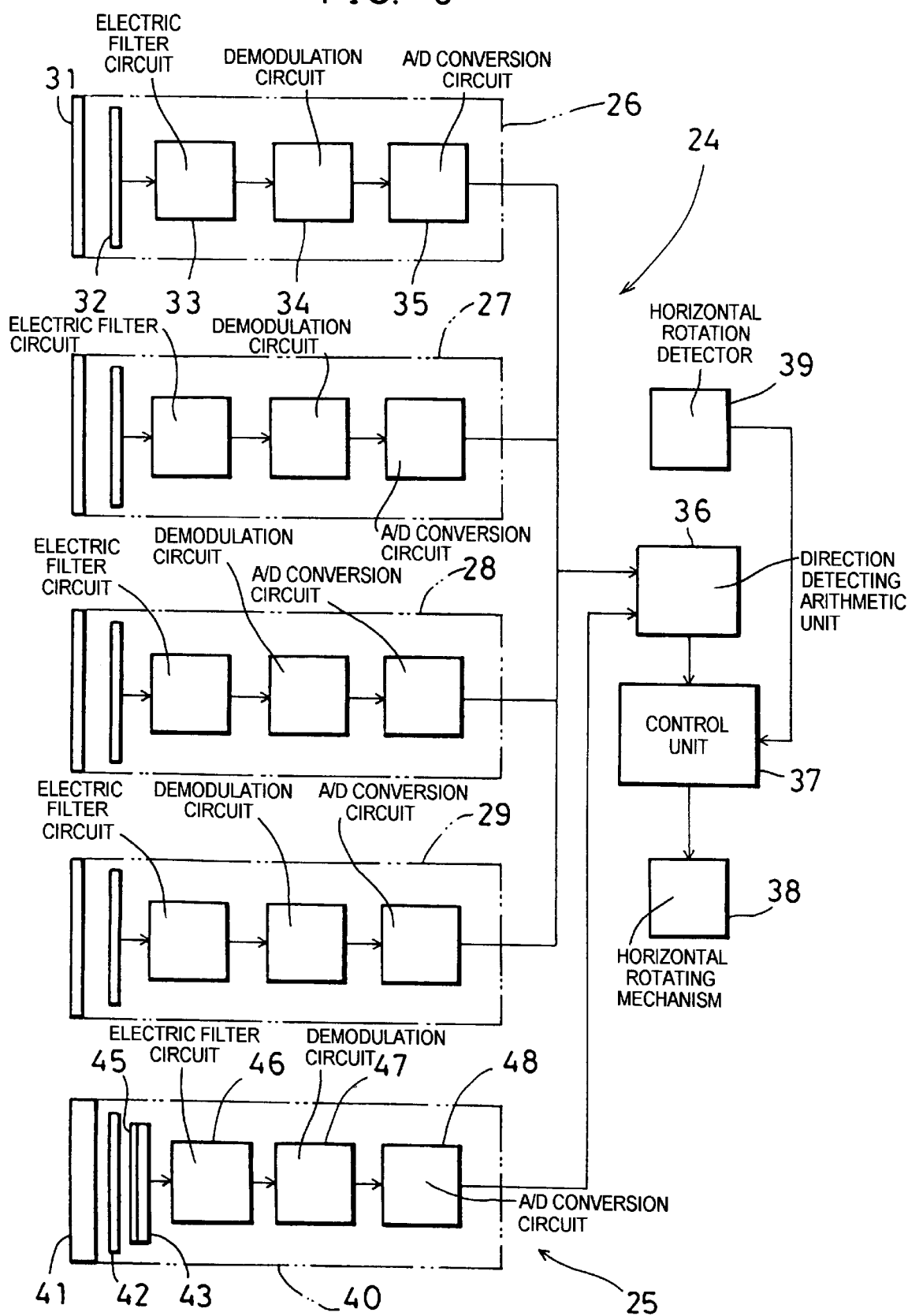
Figure 7:
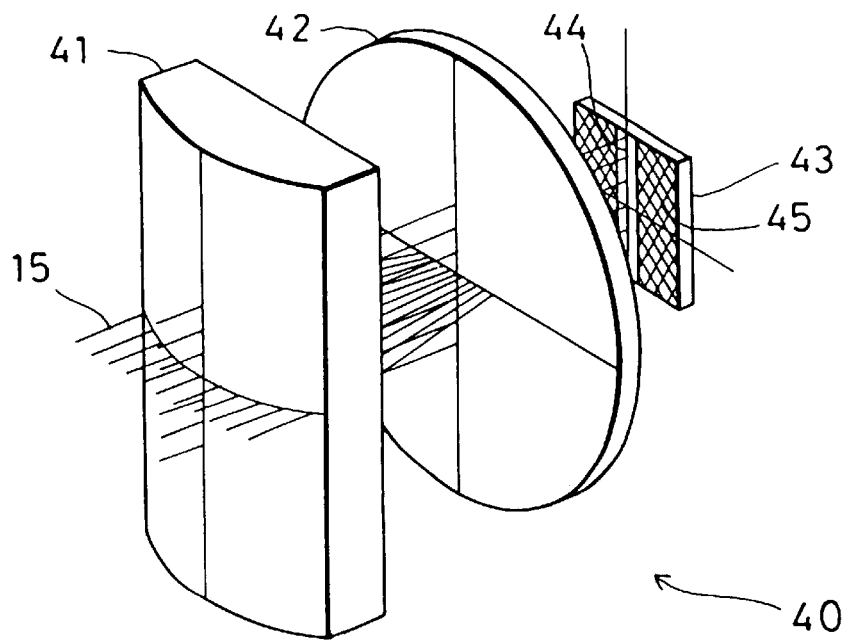
Figure 8:
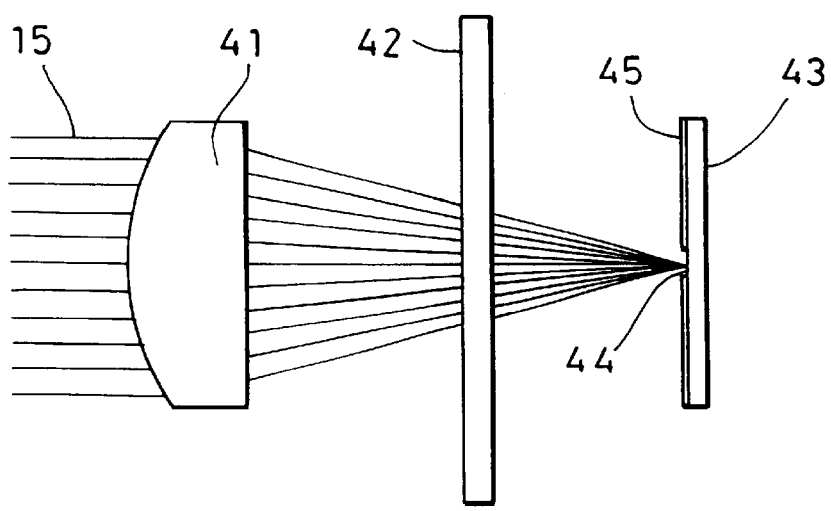
Figure 9:
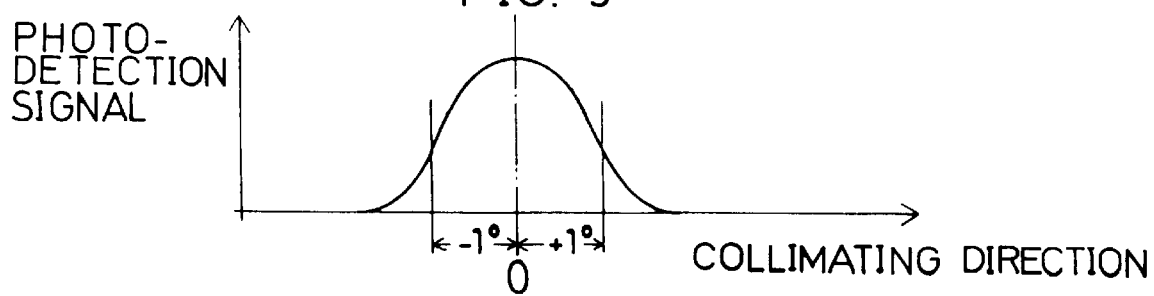
Figure 10:
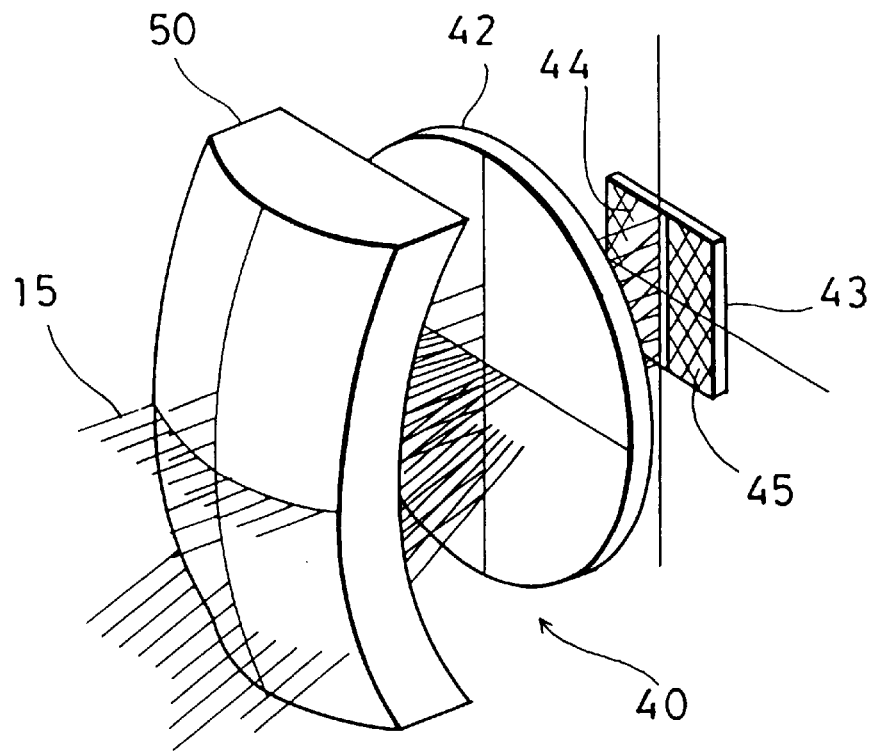
Figure 11:
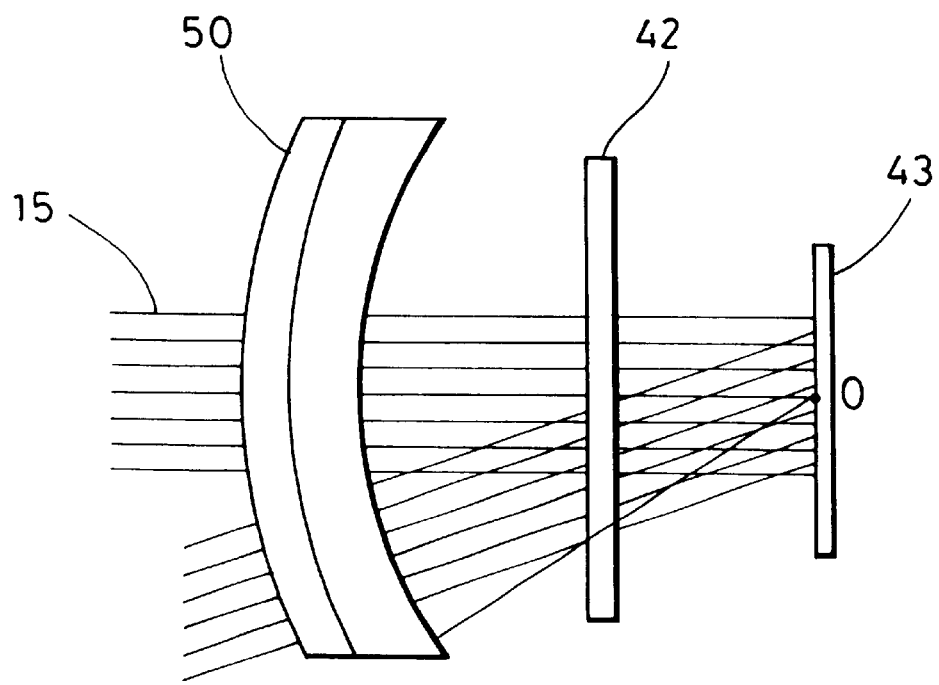
Figure 12:
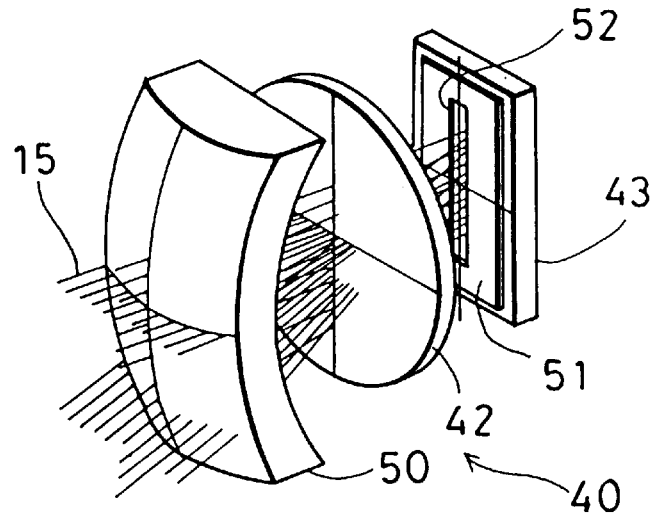
Figure 13:
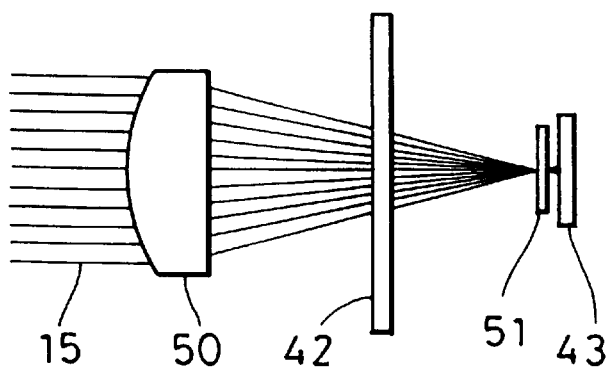
Figure 14:
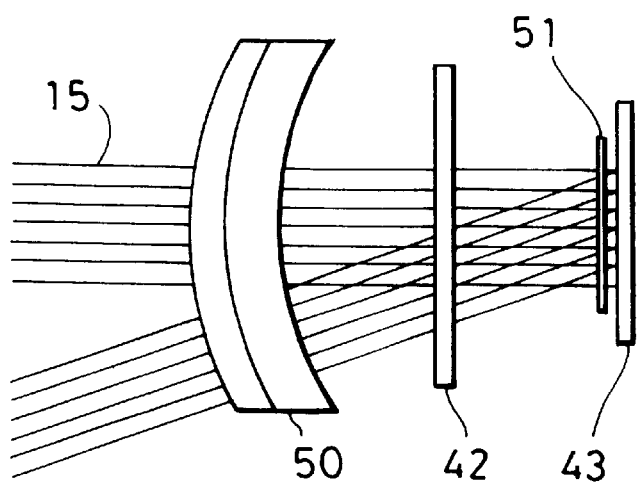
Figure 15:
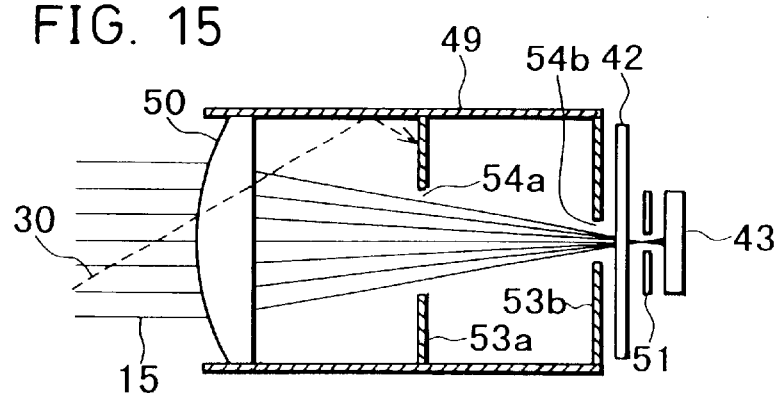
Figure 16:
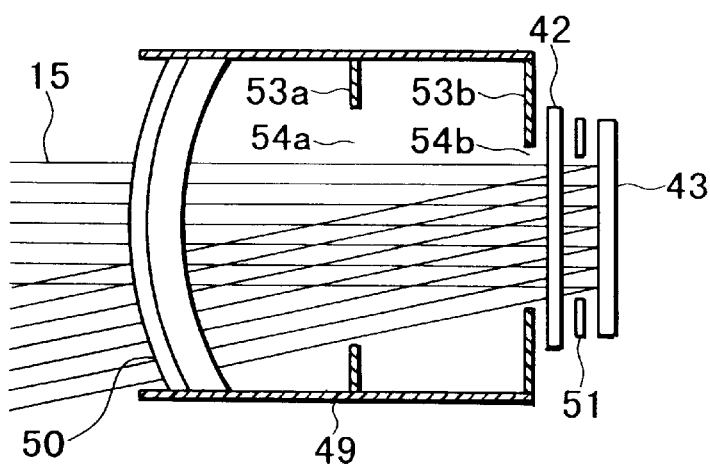
Figure 17:
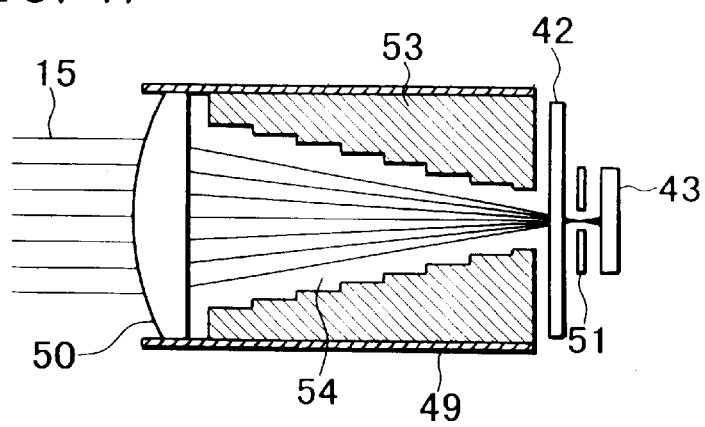

FIG. is a block diagram of a projecting device provided on a collimation target which is to be installed with respect to the survey instrument;

FIG. 6 is a block diagram showing an essential portion of the embodiment of the present invention;

FIG. 7 is a perspective view of an essential portion of a precise photodetection unit of the embodiment of the present invention;

FIG. 8 is a plan view of an essential portion of the precise photodetection unit;

FIG. 9 is a diagram showing a photodetection signal from the precise photodetection unit;

FIG. 10 is a perspective view of a precise photodetection unit of a second embodiment of the present invention;

FIG. 11 is a side view of an essential portion of the precise photodetection unit of the second embodiment;

FIG. 12 is a perspective view of an essential portion of a precise photodetection unit of a third embodiment of the present invention;

FIG. 13 is a plan view of an essential portion of a precise photodetection unit of the third embodiment;

FIG. 14 is a side view of an essential portion of the precise photodetection unit of the third embodiment;

FIG. 15 is a plan view of an essential portion of a precise photodetection unit of a fourth embodiment of the present invention;

FIG. 16 is a side view of an essential portion of the precise photodetection unit of the fourth embodiment; and FIG. 17 is a side view of an essential portion of a precise photodetection unit of fifth embodiment of the present invention.

DETAILED DESCRIPTION OF THE PREFERRED EMBODIMENTS

Description will be given bellow on embodiments of the present invention referring to the drawings.

Figure 1:
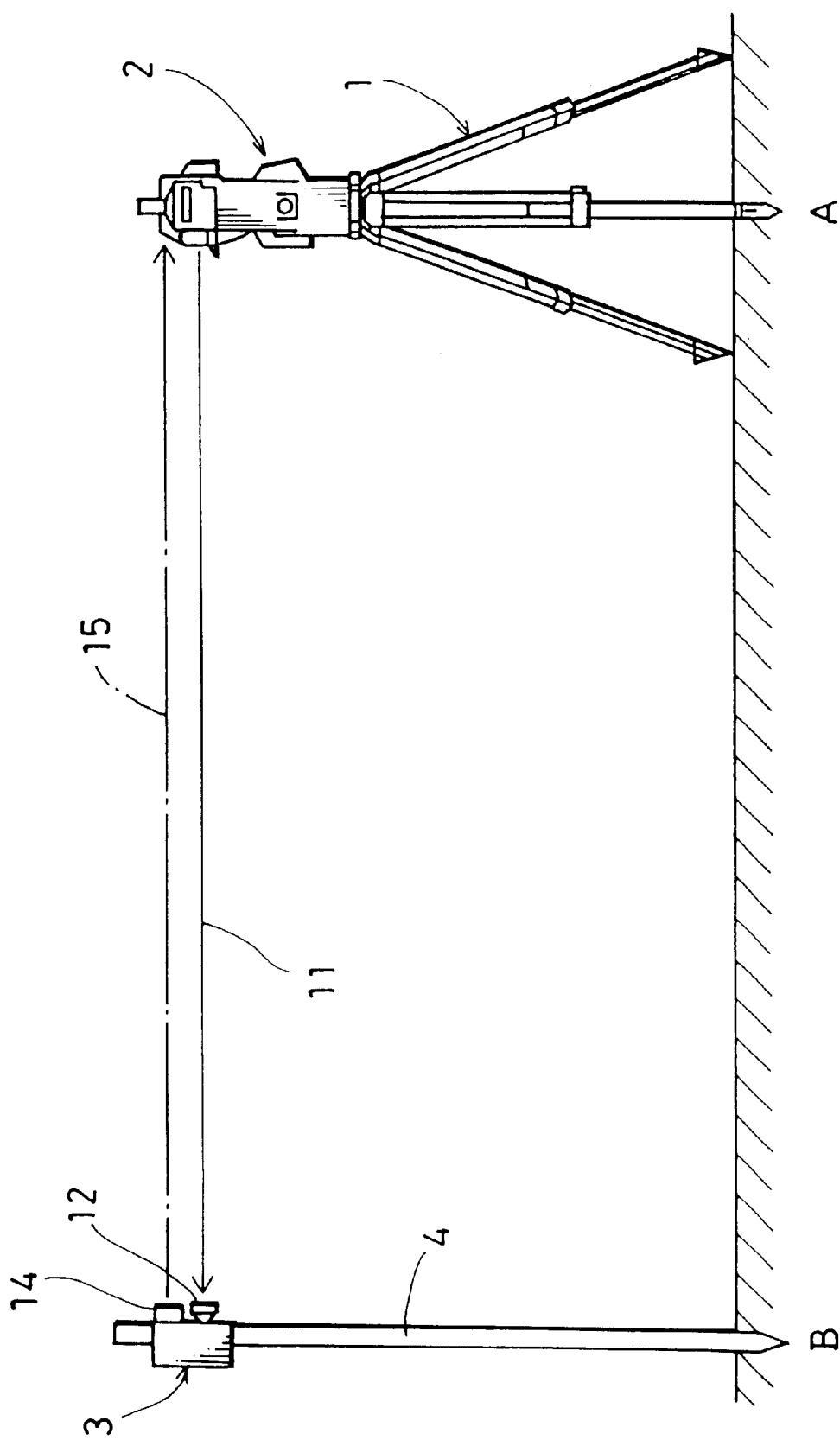
FIG. 1 is a general schematical view of an embodiment of the present invention.

In FIG. 1, a survey instrument 2 is installed at a known point A via a tripod 1. At a target point B, a pole 4 is erected, and a collimation target 3 is attached on the pole 4.

Figure 2:
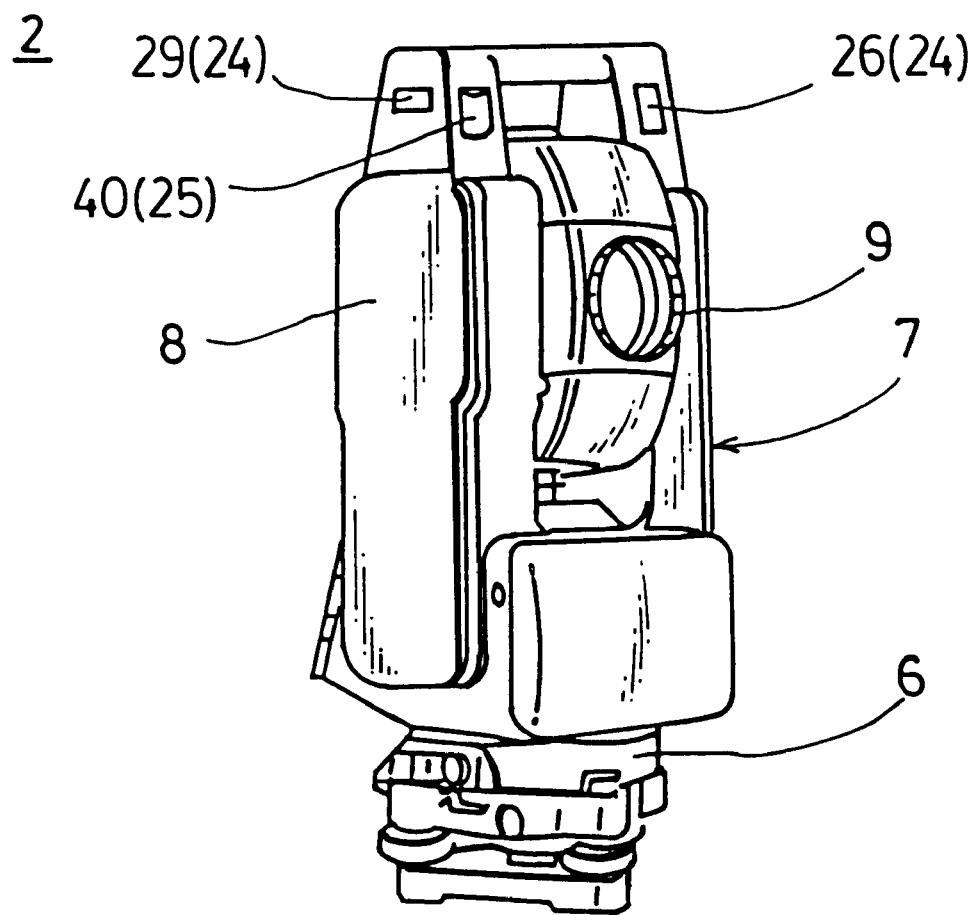
FIG. 2 is a perspective view of a survey instrument main unit in the above embodiment.
Figure 4:
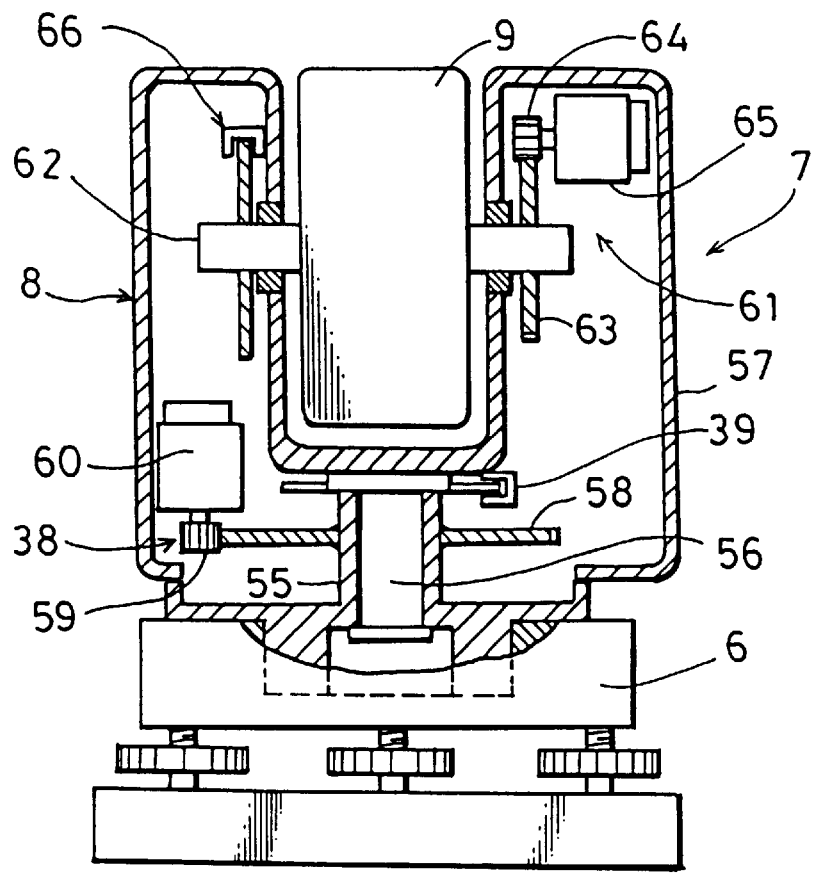
FIG. 4 is a sectional elevation view of the survey instrument main unit.

As shown in FIG. 2 and FIG. 4, the survey instrument 2 comprises a base plate 6 mounted on the tripod 1, and a survey instrument main unit 7, which is rotatably mounted around a vertical axis on the base plate 6. The survey instrument main unit 7 comprises a base stand 8 and a telescope 9, which is rotatably mounted around a horizontal axis on the base stand 8.

Inside the base stand 8, there is provided a horizontal rotating mechanism 38, which rotates (horizontally) the survey instrument main unit 7 around the vertical axis.

A horizontal rotation shaft 56 is rotatably supported on a bearing unit 55 mounted on the base plate 6, and a housing 57 of the base stand 8 is rotatably mounted on the horizontal rotation shaft 56. A horizontal rotating gear 58 is fixed on the bearing unit 55, and a horizontal rotation driving gear 59 is engaged with the horizontal rotating gear 58. A horizontal rotating motor 60 is provided inside the housing 57, and the horizontal rotation driving gear 59 is fitted to the output shaft of the horizontal rotating motor 60. A horizontal rotation detector 39 is provided with respect to the horizontal rotation shaft 56. The horizontal rotation detector 39 and the horizontal rotating motor 60 are connected to a control unit 37, which is to be described later.

A vertical rotating mechanism 61 is arranged inside the base stand 8.

The telescope 9 is rotatably supported on the housing 57 via a vertical rotation shaft 62, and a vertical rotation gear 63 is fitted to the vertical rotation shaft 62, and a vertical rotation driving gear 64 is engaged with the vertical rotation gear 63. The vertical rotation driving gear 64 is fitted to the output shaft of a vertical rotating motor 65 provided inside the housing 57. A tilt angle detector 66 is arranged to the vertical rotation shaft 62, and the tilt angle detector 66 and the vertical rotating motor 65 are connected to the control unit 37.

When the survey instrument main unit 7 is rotated horizontally by the horizontal rotating mechanism 38, the horizontal angle is detected by the horizontal rotation detector 39. The telescope 9 is vertically rotated (tilted) by the vertical rotating mechanism 61, and the tilt angle is detected by the tilt angle detector 66.

Detection results of the horizontal rotation detector 39 and the tilt angle detector 66 are inputted to the control unit 37, and driving of the horizontal rotating mechanism 38 and the vertical rotating mechanism 61 is controlled by the control unit 37.

A range-finding beam 11 is projected from the survey instrument main unit 7 toward the collimation target 3. The range-finding beam 11 is reflect ed by a reflection unit (a corner cube 12) attached on the collimation target 3. The survey instrument main unit 7 receives the reflection light beam from the corner cube 12, and the distance between the known point A and the target point B is measured.

The collimation target 3 comprises a projecting device 14 for projecting guide light 15 for tracking toward the survey instrument 2.

Figure 5:
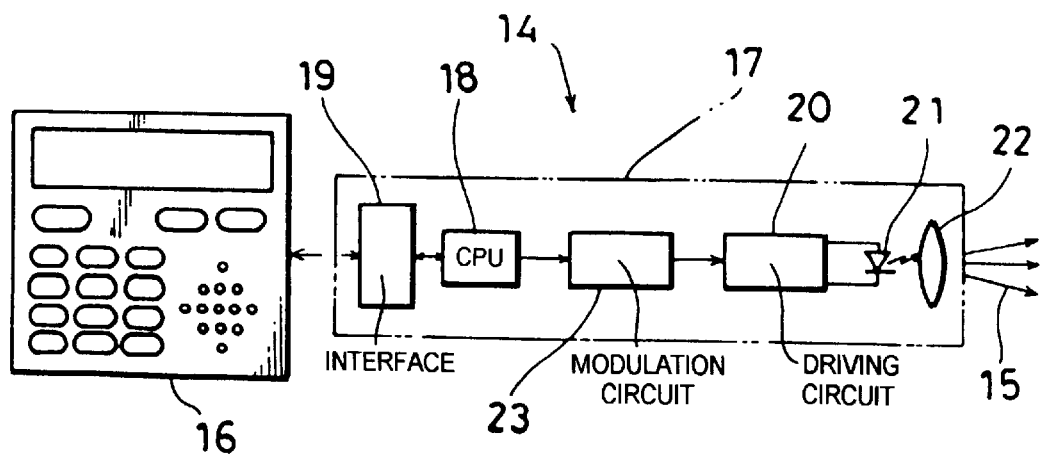

Now, description will be given on the projecting device 14 referring to FIG. 5.

The projecting device 14 primarily comprises an operation unit 16 arranged on the backside of the collimation target 3, and a projection control 17. The projection control 17 comprises a CPU 18 for controlling light emission, an interface 19 for connecting the CPU 18 with the control unit 16, a modulation circuit 23 to be connected to the CPU 18, a driving circuit 20 for driving and emitting a light emitting element 21 based on a signal from the modulation circuit 23, and a projecting lens 22 for converging the laser beam emitted from the light emitting element 21 and for projecting the light beam as the guide light 15.

The survey instrument main unit 7 comprises a collimation target searching means as to be described later. The collimation target searching means detects the guide light 15 projected from the projecting device 14 and collimates the survey instrument main unit 7 to the collimation target at a position where the guide light 15 is projected.

The collimation target searching means comprises a rough direction detecting unit 24 and a precise direction detecting unit 25.

Figure 3:
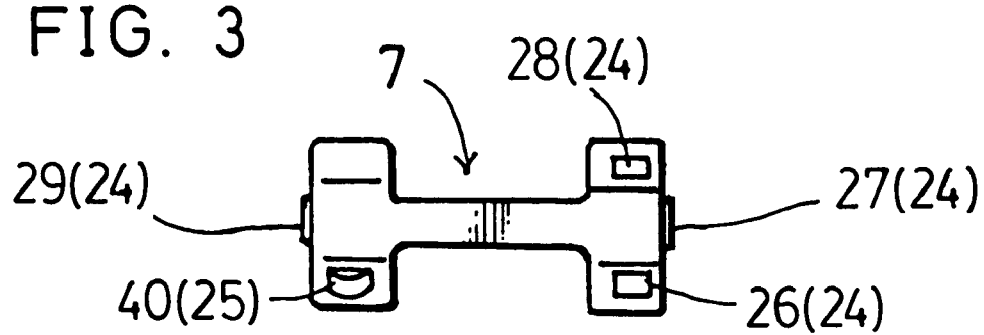
FIG. 3 is a plan view of the survey instrument main unit.

First, the rough direction detecting unit 24 will be described in connection with FIG. 2, FIG. 3 and FIG. 6.

On four surfaces of the base stand 8 except upper and bottom surfaces, photodetection units 26, 27, 28 and 29 are provided. All of the photodetection units 26, 27, 28 and 29 are designed in the same manner. In the following, description will be given only on the photodetection unit 26, and no detailed description will be given on the other photodetection units 27, 28 and 29.

The photodetection unit 26 essentially comprises a photodetection window 31, a photodetection element 32, an electric filter circuit 33, a demodulation circuit 34, and an A/D conversion circuit 35.

A signal from each of the photodetection units 26, 27, 28 and 29 is inputted to a direction detecting arithmetic unit 36, which detects the approximate direction depending on whether the signal from the photodetection units 26, 27, 28 or 29 is strong or weak, and the result of the detection is sent to the control unit 37. The control unit 37 drives a horizontal rotating mechanism 38 incorporated in the base plate 6 and turns the optical axis of the telescope 9 toward the collimation target 3.

Now, the precise direction detecting unit 25 will be described in connection with FIGS. 2, 3, 6, 7 and 8.

A precise photodetection unit 40 is provided on the surface of the base stand 8, which faces in the same direction as the surface where an objective lens of the telescope 9 is arranged. The precise photodetection unit 40 comprises a cylinder lens 41, also served as a photodetection window, a band-pass filter 42 allowing to pass a wavelength range of the guide light 15, a photodetection element 43 arranged on focusing a position of the cylinder lens 41, a mask 45 arranged in such manner as to form a slit photodetection surface 44 on the photodetection element 43, an electric filter circuit 46, a demodulation circuit 47, and an A/D conversion circuit 48. An axis of a convex surface of the cylinder lens 41 is extended in a vertical direction and the lens converges the entering guide light 15 in a horizontal direction. The electric filter circuit 46, the demodulation circuit 47, and the A/D conversion circuit 48 are designed in the same manner as the electric filter circuit 33, the demodulation circuit 34, and the A/D conversion circuit 35 as already described.

A photodetection signal of the precise photodetection unit 40 is inputted to the direction detecting arithmetic unit 36. When the photodetection signal from the precise photodetection unit 40 is inputted, the direction detecting arithmetic unit 36 calculates the direction of the collimation target 3 from the photodetection signal. When the signal from the precise photodetection unit 40 is inputted, the signal from the horizontal rotation detector 39 is inputted to the control unit 37. Based on the signals from the precise photodetection unit 40 and the signal from the horizontal rotation detector 39, the control unit 37 determines the direction of the collimation target 3. Then, the horizontal rotating mechanism 38 is driven, and the collimating direction of the telescope 9 is ultimately aligned on the collimation target 3.

In the following, description will be given on an operation.

In case the survey operation is started or in case tracking cannot be achieved during the survey operation, an operation mode of the survey instrument 2 is turned to a searching mode.

The searching mode has two aspects, i.e. a rough direction searching mode and a precise direction searching mode. First, the collimation target 3 is searched in the rough direction searching mode. In the rough direction searching mode, the direction detecting arithmetic unit 36 can incorporate or receive a photodetection signal from the rough direction detecting unit 24, and a photodetection signal from the precise photodetection unit 40 is blocked.

The photodetection unit 26 of the rough direction detecting unit 24 is provided on the same surface as the precise photodetection unit 40, and the other photodetection units 27, 28 and 29 are provided on three different surfaces respectively. Accordingly, the guide light 15 from the projecting device 14 is received by at least one of the photodetection units 26, 27, 28 or 29. In case only one of the photodetection units 26, 27, 28 or 29 receives the guide light 15, the direction detecting arithmetic unit 36 determines the rotating direction depending on the photodetecting position. The survey instrument main unit 7 is rotated via the horizontal rotating mechanism 38, and the direction of the survey instrument main unit 7 is determined at a position where the photodetection signal contains only the signal from the photodetection unit 26. In case the photodetection unit 27 receives the beam, for example, the survey instrument main unit 7 is rotated counterclockwise. In case the photodetection unit 29 receives the beam, it is rotated clockwise. In brief, it is designed in such manner that only the photodetection unit:26 receives the guide light 15 at the shortest distance.

In case two of the photodetection units 26, 27, 28 and 29 receive the guide light 15, photodetection intensity is comparatively calculated at the direction detecting arithmetic unit 36. For example, when there are photodetection signals from the photodetection units 26 and 27, the photodetection signals from the photodetection units 26 and 27 are compared with each other, and it is determined which of the photodetection units has higher photodetection signal. Based on the intensity of:the photodetection signal, the direction detecting arithmetic unit 36 determines a rotating direction of the horizontal rotating mechanism 38. For example, if the photodetection signal from the photodetection unit 26 is higher, which is arranged on the same surface as the surface where the precise photodetection unit 40 is arranged, the direction detecting arithmetic unit 36 drives the horizontal rotating mechanism 38, and the survey instrument main unit 7 is rotated in such direction that the photodetection signal from the photodetection unit 26 becomes higher, i.e. in the counterclockwise direction in FIG. 3. In this case again, it is designed in such manner that only the photodetection unit 26 receives the guide light 15 at the shortest distance.

To simplify the operation sequence, the rotating direction of the survey instrument main unit 7 by the horizontal rotating mechanism 38 in the searching mode may be determined to one direction. In this case, when the survey instrument main unit 7 is rotated in a predetermined direction by the horizontal rotating mechanism 38 and the signal from the rough direction detecting unit 24 is turned to the signal from the photodetection unit 26 only, the rough direction searching mode is terminated.

When the rough direction searching mode is terminated, it is in such condition that the photodetection unit 26 is facing to the collimation target 3 so that the photodetection signals from the photodetection units 27, 28 and 29 except the signal from the photodetection unit 26 are negligible. Therefore, the direction of the survey instrument main unit 7 is at least within the range of ±45° with respect to the correctly collimated state.

When the rough direction searching mode is terminated, it is turned to the precise direction searching mode.

In the precise direction searching mode, the horizontal rotating mechanism 38 is reciprocally rotated within the range of ±45°. The direction detecting arithmetic unit 36 incorporates the signal from the precise photodetection unit 40 and blocks the signal from the rough direction detecting unit 24. As the survey instrument main unit 7 is rotated, the guide light 15 enters through the cylinder lens 41 during rotation.

The cylinder lens 41 converges the guide light 15 to a horizontal direction and the light is projected as linear light to a photodetection surface of the photodetection element 43. The band-pass filter 42 allows to pass the wavelength range of the guide light 15 and cuts off the other disturbance light. As a result, the photodetection element 43 can receive the guide light 15 with high S/N ratio.

Because the photodetection surface of the photodetection element 43 is covered by the mask 45 except the slit photodetection surface 44, the photodetection element 43 issues a photodetection signal only when the linear guide light 15 projected passes through the slit photodetection surface 44. FIG. 9 is a diagram showing a photodetection signal from the photodetection element 43 except disturbance light. A width of the slit photodetection surface 44 is set in such manner that the photodetection range is ±1°. That is, the guide light 15 can be received within the range of ±1°.

The direction detecting arithmetic unit 36 calculates a peak value of the photodetection signal from the precise photodetection unit 40 or calculates a weighted position of the entire photodetection signal. At the peak value of the photodetection signal, i.e. at the weighted position, the direction of the optical axis of the telescope 9 is aligned with the direction of the optical axis of the guide light 15 of the collimation target 3. The control unit 37 incorporates an angular signal of the horizontal rotation detector 39 at the peak value of the photodetection signal and at the weighted position, and a horizontal angle is determined, at which the telescope 9 accurately collimates the collimation target 3. When the horizontal angle is determined, the control unit 37 drives the horizontal rotating mechanism 38 and rotates the survey instrument main unit 7 so that the angle detected by the horizontal rotation detector 39 is turned to the determined angle.

When the collimation is completed, the operation mode of the survey instrument 2 is turned to a tracking mode.

As described above, the photo detection element 43 can receive the guide light 15 at the horizontal angle ±1° of the telescope 9. When the collimation target 3 moves within a range not deviated from the horizontal angle ±1°, the survey instrument main unit 7 tracks the collimation target 3, and the collimation is promptly completed.

No specific description is given on the collimation in a vertical direction of the telescope 9. The slit photodetection surface 44 of the photodetection element 43 is divided into two portions, i.e. upper and lower portions with the boundary at the center, so that the photodetection signal can be obtained from each of the divided photodetection surfaces. After the collimation in the horizontal direction is completed, the vertical rotating mechanism 61 is driven so that ratio of the photodetection signals from the divided two photodetection surfaces is turned to 1, and that the optical axis of the telescope 9 is aligned with the center of the slit photodetection surface 44.

As described above, to search the collimation target 3, the direction of the survey instrument main unit 7 is aligned first to the direction of the collimation target 3 by the rough direction searching mode. Because the guide light 15 is detected by the photodetection,units 26, 27, 28 and 29 arranged on the four surfaces of the survey instrument main unit 7, the direction of the collimation target 3 can be immediately identified from the result of detection of the photodetection units 26, 27, 28 and 29. At the maximum rotation of 180°, and without rotating further, the direction of the survey instrument main unit 7 can be turned toward the collimation target 3 within short time.

Further, in the precise direction searching mode, the slit photodetection surface 44 for receiving the guide light 15 is longer in a up-to-bottom direction. Therefore, even when vertical angle of the telescope 9 is somewhat deviated with respect to the collimation target 3, the precise photodetection unit 40 can perfectly detect the guide light 15. To search the collimation target 3, it will suffice only to rotate the survey instrument main unit 7 by reciprocal rotation of for an angle of ±45°, only once. When the guide light 15 is detected by the photodetection element 43, the accurate collimating direction can be determined, and the collimating direction of the telescope 9 can be rapidly and accurately aligned to the collimation target 3 as described above.

It is needless to say that abnormal convex lens may be used as the cylinder lens 41 in the above embodiment.

FIG. 10 and FIG. 11 each represents a second embodiment of the invention.

In the second embodiment, the vertical angle of the precise photodetection unit 40 to detect the guide light 15 is further made larger. In FIG. 10 and FIG. 11, the same components as shown in FIG. 7 and FIG. 8 are referred by the same symbols, and detailed description is not given here.

In the second embodiment, the cylinder lens 50 is different from the cylinder lens 41 shown in FIG. 7 and FIG. 8 in that the cylinder lens 41 is curved in an arcuate shape around the focal point of the lens. That is, the convex surface of the cylinder lens 50 is a part of the rotary curved surface around the focal point of the cylinder lens 41, and the surface of the cylinder lens 50 closer to the band-pass filter 42 is a part of the cylindrical surface, which is formed around the focal point of the cylinder lens 41.

As described above, the entire cylinder lens 50 is curved in the arcuate shape around the focal point. As a result, even when the guide light 15 enters the cylinder lens 50 from any angle in the vertical direction, the refractive action of the cylinder lens 50 is not exerted as far as it is concerned with the vertical direction of the beam. Therefore, regardless of the vertical incident angle of the guide light 15, the guide light 15 is projected as linear light onto the photodetection element 43. Accordingly, detection accuracy does not depend on and is not influenced by the vertical incident angle of the guide light 15.

The present embodiment is useful in case the collimation target 3 is placed at a position, which is different in height from the position of the survey instrument 2.

FIG. 12–FIG. 14 each represents a third embodiment of the invention.

The third embodiment shows a variation of the precise photodetection unit 40. In this embodiment, the mask 45 in the second embodiment is replaced with a diaphragm plate 51. On the diaphragm plate 51, a slit 52 with the same shape as the slit photodetection surface 44 is formed. The diaphragm plate 51 is arranged at the focal point of the cylinder lens 50, and the photodetection element 43 is disposed at a position closer to the diaphragm plate 51 on the opposite side of the cylinder lens 50.

By the diaphragm plate 51, the precise photodetection unit 40 detects the guide light 15 within the range of ±1°.

FIG. 15 and FIG. 16 each represents a fourth embodiment.

The fourth embodiment shows another variation of the precise photodetection unit 40. That is, it differs from the second and the third embodiments in the feature that a first front stage diaphragm 53a and a second front stage diaphragm 53b are added. The operation of the cylinder lens 50, the band-pass filter 42 and the diaphragm plate 51 is the same as in the above embodiments.

The first front stage diaphragm 53a is arranged on an inner surface at an intermediate position of a lens-barrel 49, which holds the cylinder lens 50, and the second front stage diaphragm 53b is disposed on the end of the lens-barrel 49 on the opposite side of the cylinder lens 50. The diaphragm plate 51 is arranged at the position of the focal point of the cylinder lens 50, and the photodetection element 43 is disposed at a position closer to the diaphragm plate 51 on the opposite side of the cylinder lens 50. The band-pass filter 42 is arranged between the second front stage diaphragm 53b and the diaphragm plate 51.

The first front stage diaphragm 53a is on the same axis as the slit photodetection surface 44 and the slit 52 formed by the mask 45, and it has a slit 54a extending in the same direction. Similarly, the second front stage diaphragm 53b has a slit 54b. Each of the slits 54a and 54b has such slit width and length that the light:,beam of the guide light from the collimation target 3 is not blocked when the precise photodetection unit 40 is directed perpendicularly to the collimation target 3.

As described above, the width of the slit photodetection surface 44 is set in such manner that the photodetection range in the horizontal direction is ±1°. When lights enter the precise photodetection unit 40 from a direction deviated by ±1° of the photodetection range and is reflected by the inner surface of the lens-barrel 49 or reflected from the inner portion of the precise photodetection unit 40 and when this lights are received on the photodetection element 43, they are turned to disturbance lights, and the S/N ratio is decreased.

When the disturbance lights enter the precise photodetection unit 40 beyond the photodetection range of ±1° and is reflected by the inner surface of the lens-barrel 49, the disturbance lights 30 are cut off by the front stage diaphragms 53a and 53b. As a result, the disturbance lights 30 do not reach the photodetection element 43. The photodetection element 43 receives only the guide light 15, and the S/N ratio is increased.

Because the front stage diaphragms 53a and 53b are provided, only the guide light 15 enters the photodetection element 43, and the S/N ratio is increased and detection accuracy is improved. Further, the amplification factor of the photodetection signal from the photodetection element 43 can be set to photodetection intensity of the guide light 15. This facilitates the setting procedure and makes it possible to avoid the problem that the setting should be repeatedly performed.

FIG. 17 shows a fifth embodiment of the invention.

In this fifth embodiment, a front stage diaphragm 53 having a slit 54 is arranged, and a width and a length of the slit 54 are gradually reduced on the inner surface of the lens-barrel 49. The slit width and the slit length of the slit 54 are designed in such manner that the slit matches well with a converging condition of the guide light 15 and does not cut off the guide light.

The fifth embodiment provides an effect similar to the effect when numbers of the front stage diaphragms 53a and 53b are increased in the fourth embodiment. The reflection lights inside the precise photodetection unit 40 can be effectively cut off, and the S/N ratio is increased.

According to the present invention, when the collimation of the survey instrument main unit is performed according to the guide light, it is possible to confirm the collimation target, and to quickly direct the survey instrument main unit toward the collimation target. Further, by providing the front stage diaphragms, it is possible to improve the photodetection S/N ratio of the guide light, to facilitate the system adjustment, and to perform collimation of the survey instrument main unit within short time. In case the survey instrument main unit is ultimately collimated, collimation can be accurately performed only according to the photodetection result of a single photodetection sensor of the precise direction detecting unit. As a result, it is possible to design the circuit in a simple structure. Because there is the wide range for the vertical angle, at which the guide light can be detected by the direction detecting unit, the system can also be used when there is difference in height between the survey instrument main unit and the collimation target.

What is claimed is:

1. A surveying system, comprising a collimation target for projecting a guide light, a survey instrument main unit for receiving and detecting said guide light projected from said collimation target, a horizontal rotating mechanism for rotating the survey instrument main unit in a horizontal direction in order to direct said survey instrument main unit to said collimation target, a control unit for controlling said horizontal rotating mechanism, a rough direction detecting unit capable to detect said guide light from all horizontal directions, and a precise direction detecting unit for detecting said guide light from the collimating direction of said survey instrument main unit, wherein said precise direction detecting unit comprises a photodetection sensor, a photodetection limiting means for limiting a photodetection range in a horizontal direction of said photodetection sensor in a range of a predetermined angle, and a cylinder lens curved in an arcuate shape in a vertical direction for making the photodetection range larger in a vertical direction and for converging said guide light at a position of said photodetection limiting means, and wherein said control unit controls said horizontal rotating mechanism so that a direction of said survey instrument main unit is approximately aligned to said collimation target based on a result of a detection from said rough direction detecting unit, and so that the direction of said survey instrument main unit precisely collimates said collimation target based on a result of a detection from said precise direction detecting unit.

2. A surveying system according to claim 1, wherein said photodetection limiting means is a mask arranged in such manner that a photodetection surface of said photodetection sensor is a slit photodetection surface.

3. A surveying system according to claim 1, wherein said photodetection limiting means is a diaphragm plate arranged at a focal point of said cylinder lens.

4. A surveying system according to claim 1, wherein said photodetection limiting means further comprises a front stage diaphragm for cutting off reflection lights in said precise direction detecting unit.

5. A surveying system according to claim 4, wherein said front stage diaphragm has a plurality of slits with size thereof gradually reduced toward a photodetection surface.

* * * * *